(12) United States Patent
Howard

(10) Patent No.: US 10,058,957 B2
(45) Date of Patent: *Aug. 28, 2018

(54) BORIC ACID FREE FLUX

(71) Applicant: LINCOLN GLOBAL, INC., City of Industry, CA (US)

(72) Inventor: Robert A Howard, Goshen, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 245 days.

This patent is subject to a terminal disclaimer.

(21) Appl. No.: 14/885,868

(22) Filed: Oct. 16, 2015

(65) Prior Publication Data

US 2016/0031046 A1    Feb. 4, 2016

Related U.S. Application Data

(62) Division of application No. 13/838,485, filed on Mar. 15, 2013, now Pat. No. 9,174,310.

(51) Int. Cl.
| | |
|---|---|
| *B23K 35/36* | (2006.01) |
| *B23K 1/00* | (2006.01) |
| *B23K 35/362* | (2006.01) |
| *B23K 35/02* | (2006.01) |

(52) U.S. Cl.
CPC ........ *B23K 35/3605* (2013.01); *B23K 1/0006* (2013.01); *B23K 35/025* (2013.01); *B23K 35/0244* (2013.01); *B23K 35/3601* (2013.01); *B23K 35/362* (2013.01); *B23K 35/3606* (2013.01); *B23K 35/3607* (2013.01)

(58) Field of Classification Search
CPC ............. B23K 1/0006; B23K 35/0244; B23K 35/025; B23K 35/3601; B23K 35/3605; B23K 35/3606; B23K 35/3607; B23K 35/362

See application file for complete search history.

(56) References Cited

U.S. PATENT DOCUMENTS

| | | | |
|---|---|---|---|
| 2,197,458 | A | 4/1940 | Wyler |
| 3,471,268 | A | 10/1969 | Bontempelli |
| 5,171,376 | A | 12/1992 | Hignett et al. |
| 6,183,883 | B1 | 2/2001 | Mori et al. |
| 6,613,159 | B1 | 9/2003 | Koch et al. |
| 9,174,310 | B2 | 11/2015 | Howard |
| 9,700,964 | B2 | 7/2017 | Howard |
| 2002/0020468 | A1 | 2/2002 | Schuster et al. |
| 2009/0120533 | A1 | 5/2009 | Vilborg |
| 2010/0175791 | A1 | 7/2010 | Gomes |
| 2013/0059162 | A1 | 3/2013 | Kobayashi et al. |

FOREIGN PATENT DOCUMENTS

| | | |
|---|---|---|
| CN | 1247448 A | 3/2000 |
| CN | 101954552 A | 1/2011 |
| CN | 103212923 A | 7/2013 |
| DE | 10108330 | 8/2002 |
| DE | 10108330 A1 | 8/2002 |
| EP | 1052053 | 11/2000 |
| EP | 1052053 A2 | 11/2000 |
| GB | 782307 | 9/1957 |
| GB | 1435858 | 5/1976 |
| JP | 2000-334597 | 12/2000 |
| WO | WO 2014/140778 | 9/2014 |

OTHER PUBLICATIONS

International Search Report and Written Opinion for PCT/IB2014/000365 dated Jan. 14, 2015.
Specification for Fluxes for Brazing and Braze Welding, American National Standards Institute, American Welding Society, Industry Literature dated Feb. 17, 2012.
Brazing Fluxes from Johnson Matthey Metals, Brazing Materials & Applications 1100:130.
International Search Report and Written Opinion for PCT/IB2015/000331 dated Sep. 22, 2016.
Office Action of Japan Patent Office for Patent Application No. 2015-227714 dated Feb. 19, 2018, 13 pages.
Chinese Office Action for Chinese Application No. 2015800126835 dated Mar. 22, 2018 in 8 pages.

*Primary Examiner* — Jenny R Wu

(57) ABSTRACT

The invention described herein pertains generally to boric acid free flux composition wherein in some embodiments, a phthalocyanine pigment is used to effect a color change at activation temperature.

12 Claims, No Drawings

BORIC ACID FREE FLUX

PRIORITY

The present application is a divisional of U.S. patent application Ser. No. 13/838,485, filed on Mar. 15, 2013, which is incorporated herein by reference in its entirety.

TECHNICAL FIELD

The invention described herein pertains generally to boric acid free brazing flux compositions.

BACKGROUND OF THE INVENTION

Per the Regulation (EC) No 1272/2008 of the European Parliament and of the Council on classification, labeling and packaging of substances and mixtures"boric acid (a component of most brazing fluxes), is classified as a reproductive toxin in the European Union. This requires special labeling, leading to an effort on the part of consumers to look for boric acid free alternatives. Suitable boric acid free brazing fluxes must be developed to maintain market share and meet consumer demand.

Brazing is a thermal process, similar to soldering for joining metallic stock materials (hereinafter referred to as base metal), wherein a liquid phase is obtained by melting only the brazing metallic material (hereinafter referred to as filler metal) at temperatures exceeding 450° C. (840° F.). The solidus temperature of the base metal is not reached during this process. Filler metals can be alloys or pure metals.

Assuming pure metal surfaces, the liquid filler metal is able to spread in a thin layer on the base metal surface, wetting it. The filler metal adheres to the base metal surface by a slight alloying of the base and filler metals. The filler metal spreads out over the joint surface and, after solidifying, forms a loadable joint with the base metal.

If designed in a manner suitable for brazing, the two joint surfaces of the parts to be joined form a narrow parallel slit, or capillary. The molten filler metal then flows of its own accord into this slit due to the capillary action, filling said slit. The minimum temperature on the surface of the component to be brazed at which said process takes place undisturbed is the so-called working temperature. It is a characteristic quantity for the filler metal in question.

In order to be able to form a bond with the base metal, the molten filler metal must come into direct contact with the base metal. Oxide layers of the kind present on any engineering metal surface must thus be loosened first and removed. If brazing takes place in the air, this is achieved by covering the brazing site with fluxes in the melt flow of which the oxides dissolve, are reduced or decompose at and above the active temperature of the flux.

The flux thus primarily has the task of removing oxides present on the filler and base metal surfaces and preventing them from re-forming during the brazing process so that the filler metal is able to wet the base metal sufficiently.

The melting point and the effective temperature of the fluxes must be matched to the working temperature of the brazing filler metal used, whereby the flux should melt at about 50-100° C. below the working temperature of the filler metal used and become fully effective from this temperature onwards. Moreover, the molten flux should form a dense, uniform coating on the workpiece which remains intact at the required brazing temperature and for the duration of the brazing period.

Brazing fluxes are composed substantially of salt mixtures which, in the molten state, are capable of dissolving metal oxides. These fluxes are substantially inorganic boron compounds such as, in particular, alkali borates and fluoroborates, including boric acid, and halides such as, in particular, an alkali halide; e.g. alkali fluorides.

At least one aspect of the invention resides in the superior ability to achieve desirable flux characteristics without the presence of boric acid ($H_3BO_3$) or borax ($NaB_4O_5(OH)_4 \cdot H_2O$) in the flux.

SUMMARY OF THE INVENTION

The invention describes various flux compositions which do not contain boric acid, and which optionally include a color change pigment at activation temperature, e.g., a phthalocyanine pigment.

These and other objects of this invention will be evident when viewed in light of the detailed description and appended claims.

DETAILED DESCRIPTION OF THE INVENTION

The best mode for carrying out the invention will now be described for the purposes of illustrating the best mode known to the applicant at the time of the filing of this invention. The examples are illustrative only and not meant to limit the invention, as measured by the scope and spirit of the claims.

As used herein, the term "approximately" means within the stated ranges with a tolerance of 10%.

The present brazing flux composition is boric acid free, provides good wetting characteristics and changes color from a color in the visible spectrum to clear at activation temperature.

The invention will now be described in a series of non-limiting, but illustrative examples.

Example #1

In one embodiment of the invention, a black high temperature paste flux is described, the composition of which includes a mixture of water, potassium bifluoride, boron, udylite and fumed silica in the following weight percentages.

TABLE 1

High Temperature Boric Acid Free Paste Flux

| Component | Weight Percentage | |
|---|---|---|
| Water | balance | |
| Udylite (wetting agent 62) | 0.25-0.50% | wetting agent/surfactant |
| Potassium bifluoride ($KHF_2$) | 12.4-16.8% | etchant/clean base metal surface |
| Fumed silica ($SiO_2$) | 0.71-1.35% | emulsifying agent/plasticizer |

TABLE 1-continued

High Temperature Boric Acid Free Paste Flux

| Component | Weight Percentage | |
|---|---|---|
| Potassium tetraborate ($K_2B_4O_7 \cdot 4H_2O$) | 29.5-34.8% | dissolve metallic oxides and protect brazing surface from oxidation |
| Potassium fluoroborate ($KBF_4$) | 29.5-34.8% | dissolve metallic oxides and halides and protect brazing surface from oxidation |
| Boron | 0.50-0.98% | protect surface from oxidation at high brazing temperatures |

Example #2

In another embodiment of the invention, a low temperature boric acid free paste flux will include a mixture of water, potassium bifluoride, potassium tetraborate, potassium fluoroborate, pigment, Udylite and fumed silica in the following weight percentages.

TABLE 2

Low Temperature Boric Acid Free Paste Flux

| Component | Weight Percentage | |
|---|---|---|
| Water | balance | |
| Udylite (wetting agent 62) | 0.25-0.50% | wetting agent/surfactant |
| Potassium bifluoride ($KHF_2$) | 12.4-16.8% | etchant/clean base metal surface |
| Fumed silica ($SiO_2$) | 0.71-1.35% | emulsifying agent/plasticizer |
| Potassium tetraborate ($K_2B_4O_7 \cdot 4H_2O$) | 29.5-34.8% | dissolve metallic oxides and protect brazing surface from oxidation |
| Potassium fluoroborate ($KBF_4$) | 29.5-34.8% | dissolve metallic oxides and halides and protect brazing surface from oxidation |
| Pigment (phthalocyanine) | 0.25-0.98% | active temperature indicator |

Example #3

In another embodiment of the invention, a high temperature boric acid free powder flux will include a mixture of potassium tetraborate, potassium fluorosilicate, potassium fluoroborate and boron in the following weight percentages.

TABLE 3

High Temperature Boric Acid Free Powder Flux

| Component | Weight Percentage | |
|---|---|---|
| Potassium tetraborate ($K_2B_4O_7 \cdot 4H_2O$) | 46.2-51.6% | dissolve metallic oxides and protect brazing surface from oxidation |
| Potassium fluorosilicate ($K_2SiF_6$) | 1.20-1.99% | wetting agent/surfactant |
| Potassium Fluoroborate ($KBF_4$) | 46.2-51.6% | dissolve metallic oxides and halides and protect brazing surface from oxidation |
| Boron | 0.85-1.02% | protect surface from oxidation at high brazing temperatures |

Example #4

In another embodiment of the invention, a low temperature boric acid free powder flux will include a mixture of potassium tetraborate, potassium fluorosilicate, potassium fluoroborate and a pigment in the following weight percentages.

TABLE 4

Low Temperature Boric Acid Free Powder Flux

| Component | Weight Percentage | |
|---|---|---|
| Potassium tetraborate ($K_2B_4O_7 \cdot 4H_2O$) | 46.2-51.6% | dissolve metallic oxides and protect brazing surface from oxidation |
| Potassium fluorosilicate ($K_2SiF_6$) | 1.20-1.99% | wetting agent/surfactant |
| Potassium Fluoroborate ($KBF_4$) | 46.2-51.6% | dissolve metallic oxides and halides and protect brazing surface from oxidation |
| Pigment (phthalocyanine 500-600° C.) | 0.50-0.98% | active temperature indicator |

As described above, the phthalocyanine pigment is an aromatic macrocyclic compound that forms coordination complexes with many elements of the periodic table. These complexes are intensely colored which facilitates the color transformation at temperatures employed in the reaction. As described above, the phthalocyanine pigment is an aromatic macrocyclic compound that forms coordination complexes with many elements of the periodic table. These complexes are intensely colored which facilitates the color transformation at temperatures employed in the reaction from colored in the visible spectrum to essentially colorless at temperature. The phthalocyanine macrocyclic compound is illustrated below, and wherein a metallic ion would be coordination bonded to the nitrogen atoms, typically within the 5-membered rings.

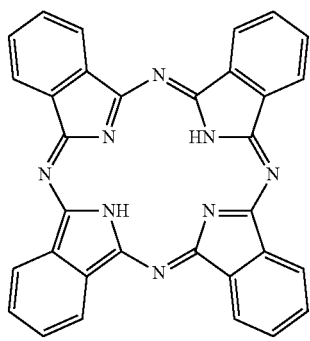 [SMILES: c1ccc2c(c1)-c1nc-2nc2[nH]c(nc3nc(nc4[nH]c(n1)c1ccccc41)-c1ccccc1-3)c1ccccc21]

The above compositions are useful for the brazing of metallic materials based on copper, silver, nickel and iron based alloys. Without being held to any one theory or mechanism of operation, the flux is used to remove the oxide layer and enable the wetting of the base materials. The activated flux creates a layer on the workpiece and removes any surface oxides. The color change at activation temperature is a distinct characteristic not seen when compared to fluxes commercially available for purchase.

The four classes of fluxes were tested and met all AWS A5.31M/A5.31:2012 testing standards for water content, particle, adhesion, fluidity, fluxing action, flow, life and viscosity.

The boric acid free fluxes described in Tables 1-4 deliver excellent performance, standing on their own as brazing fluxes. As discussed below, the boric acid free fluxes deliver results often superior to commercially available standard fluxes that are not boric acid free. The following tests were performed.

Oxide Removal

All of the boric acid free fluxes in Tables 1-4 dissolved all oxides from the base metal surface. The paste fluxes outperformed commercially available EASY-FLO® flux, which contains boric acid, having a registered office at Johnson Matthey Plc., 5th Floor 25 Farringdon Street, London EC4A 4AB, United Kingdom.

Activation Range

All of the boric acid free fluxes in Tables 1-4 are fully active, removing oxides, throughout the range of 1050° F.-1600° F. (566° C.-871 ° C.) and 1050° F.-1800° F. (566° C. - 982° C.), for the low temperature (green) flux and the high temperature flux (black) respectively.

The powder fluxes outperformed commercially available EASY-FLO® flux, which contains boric acid, commercially available from Johnson Matthey Plc. and having a registered office at 5th Floor 25 Farringdon Street, London EC4A 4AB, United Kingdom, as well as BRAZETEC® flux, commercially available from Umicore AG & Co. KG, Business Line BrazeTec, Rodenbacher Chaussee 4, 63457 Hanau Wolfgang, Germany.

Hot Rodding

"Hot Rodding" is the coating of a piece of brazing rod (filler metal) by dipping a hot end into a powdered flux. The boric acid free fluxes in Tables 1-4 coated 22% better than a commercially available powder flux, STTS Flux IT 340 M, available from STTS Brazing Solutions, Z.A.E. la Neuvillette 60240 Fleury (France).

Flux Flowability in Activation Range

A flowability test, AWS FB3-K, was performed per AWS A5.31M/A5.31:2012. Flowability was good for both the powder and the paste fluxes for the boric acid free fluxes in Tables 1-4. The paste flux flowabilty was superior, outperforming commercially available EASY-FLO® flux, which contains boric acid, commercially available from Johnson Matthey Plc., having a registered office at 5th Floor 25 Farringdon Street, London EC4A 4AB, United Kingdom.

Brazing Odor and Fumes

There was very little objectionable odor and fumes throughout the brazing process for all of the boric acid free fluxes in Tables 1-4. The powder flux had significantly less odor than that of the Castolin boric acid containing flux, which was tested, commercially available from Castolin Eutectic International.

Activation Indicator

The pigmented fluxes of Tables 2 & 4 were the only fluxes that has a visual indicator of activation temperature.

The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A boric acid free paste flux composition which comprises the following components:

| water | balance |
| --- | --- |
| a wetting agent | 0.25-0.50% |
| potassium bifluoride ($KHF_2$) | 12.4-16.8% |
| fumed silica ($SiO_2$) | 0.71-1.35% |
| potassium tetraborate ($K_2B_4O_7 \cdot 4H_2O$) | 29.5-34.8% |
| potassium fluoroborate ($KBF_4$) | 29.5-34.8% |
| pigment | 0.50-0.98% | wherein amounts of said components are on the basis of weight percentages with respect to a combined total of 100% by weight.

2. The paste flux composition of claim 1 wherein said pigment is a phthalocyanine pigment which changes from colored to colorless at a temperature of approximately 500-600° C.

3. A process of using a boric acid free paste flux of claim 1 which comprises the step of:
adding a phthalocyanine pigment to said flux.

4. The process of claim 3 wherein
said step of adding a phthalocyanine pigment effects a color change at an activation temperature of said flux.

5. The process of claim 4 wherein
said color change is effected at an activation temperature of between approximately 500-600° C.

6. A boric acid free paste flux, comprising:
a wetting agent in a weight percentage in the range of 0.25 to 0.50%;
an etchant in a weight percentage in the range of 12.4 to 16.8%;
an emulsifying agent in a weight percentage in the range of 0.71 to 1.35%;
potassium tetraborate in a weight percentage in the range of 29.5 to 34.8%;
potassium fluoroborate in a weight percentage in the range of 29.5 to 34.8%; and
pigment in a weight percentage in the range of 0.50 to 0.98%;
wherein the balance is water.

7. The boric acid free paste flux of claim 6, wherein said flux is green in color.

8. The boric acid free paste flux of claim 6, wherein said flux is fully active in the temperature range of 566° to 871° C.

9. The boric acid free paste flux of claim 6, wherein said etchant is potassium bifluoride.

10. The boric acid free paste flux of claim 6, wherein said emulsifying agent is fumed silica.

11. The boric acid free paste flux of claim 6, wherein said pigment is a phthalocyanine pigment.

12. The boric acid free paste flux of claim 6, wherein said flux changes color at a temperature within the range of approximately 500 to 600° C.

* * * * *